April 1, 1969 N. F. BOUNSALL 3,436,489

ERASING METHOD FOR VIDEO TAPE RECORDINGS

Filed Jan. 3, 1966

NORMAN F. BOUNSALL
INVENTOR.

BY Robert G. Clay

ATTORNEY

United States Patent Office 3,436,489
Patented Apr. 1, 1969

3,436,489
ERASING METHOD FOR VIDEO TAPE RECORDINGS

Norman F. Bounsall, Los Altos, Calif., assignor to Ampex Corporation, Redwood City, Calif., a corporation of California
Filed Jan. 3, 1966, Ser. No. 518,454
Int. Cl. G11b *5/02;* H04n *5/78*
U.S. Cl. 179—100.2 5 Claims

ABSTRACT OF THE DISCLOSURE

A method of editing a recorded video tape. Erasure of previously recorded tape is affected by recording the new signal directly thereover. Close registration between the locus of the recording heads in the previously recorded tracks is maintained by maintaining the head drum servo and capstan servo of the recording apparatus in a "playback" mode during recording of the new information over the old. The recording heads may be gated to a new video signal during select portions of select horizontal lines to realize special effects.

This invention relates generally to the recording of new information on an existing video tape recording, and is more particularly directed to a method of recording a new signal on video tape without the use of an erase head to erase the previous signal.

In various magnetic video tape applications it is desirable to record a new information signal on a previously recorded video tape. For example, in the editing of television recordings, new signal information is combined with the existing information recorded on a video tape. Heretofore, it has been the usual practice to erase predetermined portions of the previously recorded signal by energization of an erase head and to appropriately program recording of the new signal on the erased portions of the tape. Use of an erase head to erase portions of the existing signal which are to be re-recorded with new signal information is impractical in some applications and precludes the attainment of certain desirable special effects which might otherwise be possible. More particularly, in helical scan recordings the recorded tracks are at a very small angle (e.g., 9°) to the edges of the tape and are very long so as to contain an entire field or frame of the recorded video signal. Use of an erase head to erase these tracks would thus require a head of inordinate length, and very critical positioning of the head. As a result, electronic editing of helical scan video recordings has not been considered feasible. Furthermore, with both helical and transverse scan recordings, editing by means of wipes, windows, or other special effects involving a new recording precisely consisting of a full or partial raster, or frame, is impractical, if not impossible by employment of an erase head for erasure of corresponding portions of the existing recording in which the new recording is to be inserted.

The present invention overcomes the above-noted difficulties by providing a radio frequency erasing method in accordance with which new information may be recorded on a video tape without the use of an erase head to erase the existing signal. Erasure of the previously recorded signal is effected by recording the new signal directly thereover. The degree of erasure is determined by the extent to which the radio frequency carrier of the new signal registers over the carrier of the previous recording i.e. the degree of registration between the locus of recording head in the previously recorded tracks. Unless extemely close registration is maintained, severe noise is present in the resulting image. In accordance with the method of the invention, extremely close registration is effected by synchronizing the capstan and head drum of tape recording and reproducing apparatus employed to conduct the method, to the control track of the original recording on the tape. In other words, the apparatus is maintained in a "playback" or "tracking" mode even during recording of the new information over the old. In this manner, the apparatus if kept "on track" during successive recordings over the same tape area. A high degree of erasure is effected, and signal to noise values are maintained at reasonable levels for the newly recorded signal.

Erasure of an existing recording and the simultaneous recording of a new signal thereover, in accordance with the present method, may be initiated at any desired point of any track of the existing recording, merely by switching the recording and reproducing apparatus to the "record" mode, while maintaining the capstan and head drum in the "playback" mode. The method may be readily employed to facilitate electronic editing of helical scan video tape recordings. Short inserts may be directly accomplished by utilization of the method, and the method may be employed in conjunction with energization of an erase head disposed transverse to the tape to conduct long insert editing operations. Furthermore, the method may be applied to record new material over fragmentary portions of individual lines of the existing recorded video signal to create "windows," or other special effects.

Further features and advantages of the invention will become apparent upon consideration of the following detailed description thereof in conjunction with the accompanying drawing, wherein.

Figures 1, 2, 3, 4:
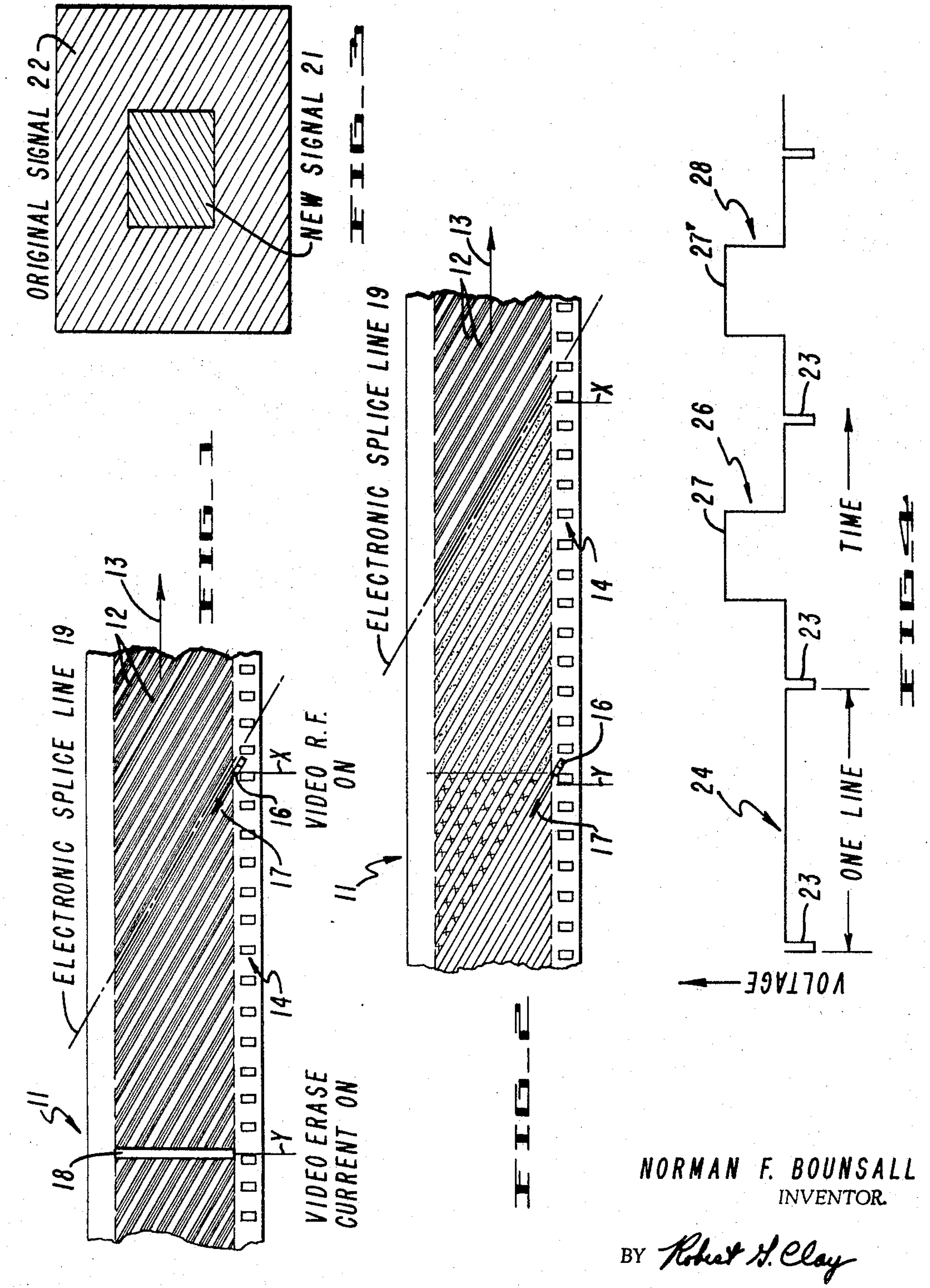
FIGURE 1 is a graphical representation of the initial steps of the erasing method as applied to the electronic editing of a helical scan video tape recording.
FIGURE 2 is a graphical representation similar to FIGURE 1, depicting latter stages of the editing process.

FIGURE 3 is a graphical illustration of a reproduced image of a video tape recording edited in accordance with the method of the invention to include a "window"; and FIGURE 4 is a graphical illustration of a switching control waveform utilized to switch the video electronics of video tape recording and reproducing apparatus between playback and record modes to provide an edited tape productive of the image of FIGURE 3.

In accordance with the present invention there is provided a method of erasing a video signal recorded on magnetic tape, while simultaneously recording a new signal on the erased portions of the tape. The method generally comprises recording the new video signal directly over an existing video signal recorded on a magnetic tape, while maintaining close registration between the radio frequency carriers of the previously recorded and newly recorded signals i.e. close registration between the locus of the recording head and the previously recorded tracks. By virtue of the close registration between the carriers, a high degree of erasure of the existing recorded signal is provided as the new signal is simultaneously recorded over the same tape area. More particularly, the degree to which the previous carrier is erased is determined by the closeness of registration of the new carrier over the old. By holding this registration close, reasonable signal-to-noise ratios of the new, or over-recorded, signal are obtained whereby an image of acceptable quality is produced upon playback of the tape.

In order to maintain close registration between the carriers of the existing and newly recorded signals, the method is conducted with conventional video tape recording and reproducing apparatus, such as described in VR-1560/VR-1550 VR-660/VR-650 Videotape Recorder, Ampex Corporation, Redwood City, Calif., 1964, in which the capstan and head drum servos are at all times maintained in a playback mode, even during recording of a new signal over the old. In this manner head drum and tape position are synchronized with the control track of the prevously recorded signal during recording of the new signal. The new signal consequently substantially directly tracks the previously recorded signal. In the playback mode of the apparatus, the head drum servo is controlled by an error voltage developed by a comparison between tachometer pulses indicative of head drum position and a reference signal which is common to the previously recorded signal and to the new signal that is to be recorded thereover. The capstan maintains proper tracking during playback of the existing signal and recording of the new signal by virtue of the capstan servo being controlled by an error voltage developed by a comparison between the tachometer pulses and the control track signal of the original recording. By virtue of such control of tape and head drum positions, substantially precise registration between the carriers of the existing and new signals is obtained. A high degree of erasure of the original signal is provided with a slight tolerable amount of noise appearing in the image produced upon playback of the tape.

The basic erasure method outlined above is particularly well suited to the accomplishment of various electronic editing operations with helical video tape recordings. More particularly, insert editing operation may be conducted with conventional helical scan video tape recording and reproducing apparatus in the manner graphically represented by FIGURES 1 and 2. As shown therein, a magnetic video tape 11 having helically scanned tracks 12 of a video signal recorded thereon is moved in the direction of arrow 13 through conventional helical scan video tape recording and reproducing apparatus which is initially in a playback mode so as to display the existing recording on an associated monitor, or the like. In this regard, the capstan and head drum servos are in a playback mode, as previously noted, and tape and head drum positions are synchronized with the control track 14 of the existing recording. A video head 16 on the drum is scanning the video tracks 12 in the direction of arrow 17 and the video electronics are in a playback mode to reproduce the signal from the video tracks. A video erase head 18 disposed transverse to the tape at a position displaced upstream from the head drum is unenergized at this time.

Now assume that it is desired to insert a new video signal in the existing recording when a point X of the tape is adjacent the video head 16, as shown in FIGURE 1. A point Y of the tape is at this time adjacent the video erase head 18. If a long insert, i.e., an insert extending over an area of tape exceeding that between points X and Y, is to be made it is preferable that as much of the new insert material as possible be recorded on completely erased tape inasmuch as some noise is still present with the high degree of, but still partial erasure effected by recording directly over the existing recording in accordance with the basic aspects of the method. Accordingly, when points X and Y are respectively adjacent the video head 16 and video erase head 18, the video electronics are switched to the record mode and energized with the new video signal to be inserted, while the erase head is simultaneously energized with video erase current. The capstan and head drum servos, however, are maintained in the playback mode to cause the new signal to track the old and effect substantial registration between the carriers thereof. The video head successively scans the tracks upstream from point X to record the new video signal thereon. The tape upstream from point Y, including portions of tracks and complete tracks, is erased as the tape moves past the transversely disposed erase head 18. Thus, an initial number of complete tracks are erased by recording of the new signal directly over the existing recorded tracks. Subsequently, tracks are scanned which are intersected by a transverse line through point Y. These tracks are made up of segments on one side of the line wherein the new video signal is recorded directly over the existing signal and segments on the other side of the line wherein the signal is recorded on completely erased tape. Tracks originating upstream from point Y are completely erased such that beyond this point entire tracks of the new signal are recorded on completely erased tape. The foregoing circumstances are graphically depicted in FIGURE 2 which illustrates the tape as having been moved a distance X–Y. Point Y of the tape is thus at this time adjacent the video head 16. In the figures, the original video signal is represented by shaded lines, new video material recorded over the original signal and containing a slight amount of radio ferquency interference is designated by dots, the new video material recorded on completely erased tape is represented by X's, and completely erased tape upstream from the video head 16 is represented by blanks. Thus a diagonal electronic splice line 19 exists which extends through the point X. On the downstream side of the splice line, the tape contains tracks of the original video signal. On the upstream side of the splice line there is provided a transition region X–Y containing tracks of the new video signal together with a slight amount of radio frequency interference that progressively diminshes to a negligible amount at point Y. A relatively small number of complete tracks in the initial portion of the transition region contain the slight amount of interference, whereas in the final portion of the transition region the segments of successive tracks containing interference become of progressively shorter lengths, diminshing to zero at point Y. Thus, during playback of the transition region, a slight amount of radio frequency interference initially appears in the reproduced image immediately following the splice line, and thereafter rapidly progressively diminshes as a vertical wipe.

In order to conduct a short insert editing operation, i.e., an insert extending over an area of the tape less than that between points X and Y, the video head 16 is energized with the new video signal, in the manner described for a long insert, but the video erase head 18 is not energized. Otherwise, a blank spot in the tape would result. During a short insert, erasure of the existing signal is effected entirely by recording of the new signal directly over the old and hence contains a slight amount of interference.

Referring now to FIGURES 3 and 4, the applicability of the method of the invention to the editing of video tape to provide various special effects, such as a window of new video information in the reproduced image, is demonstrated. In this regard, it is, for example, desired to provide a window 21 containing a stationary scene centrally of the reproduced image 22 of the original video tape recording. It will be appreciated that such a partial image is produced by a recording wherein substantially the first and last thirds of the lines comprising each field contain the original video signal. The central third of the lines of the field, however, each have first and last thirds containing the original signal and a central third containing the new signal. The window effect may be thus readily edited in accordance with the inventive method by recording the new video material directly over the original signal in the central third segment of each of the lines in the central third of a field. This may be advantageously accomplished by applying the new signal to conventional video tape recording and reproducing apparatus of either the helical or transverse scan types, and appropriately gating the video record electronics on and off in the central portions of the lines of the central portion of each field, by means of fast electronic switching means of the type described in a copending application of Norman F. Bounsall and Donald B. MacLeod, Serial No. 211,363, now United States Patent 3,331,927 assigned to the assignee of the present invention. The head drum and capstan servos of the apparatus are at all times maintained in the playback mode, even when the record electronics are gated on and the new signal is being recorded. This insures close registration between the radio frequency carriers of the respective signals such that a high degree of erasure is effected, and control of tape and head drum positions commensurate with recording of the new signal in the correct portion of each horizontal line. The foregoing is readily accomplished by means of a tape apparatus synchronizing system of the type disclosed in U.S. Patent No. 3,017,462. In this regard, the system is placed in the playback mode during recording of the new signal such that a high degree of time base stability is maintained between the original and new signal.

The switching means of the above-referenced United States Patent 3,331,927 is such that the playback electronics of video tape recording and reproducing apparatus are normally coupled to the video RF head circuit while the record electronics are decoupled therefrom. However, in response to a gating pulse applied to the switching means, the record electronics are rapidly coupled to the video head circuit while the playback electronics are simultaneously decoupled therefrom. Upon termination of the gate pulse, the switching means rapidly reverts to its original condition wherein the record electronics are decoupled from the head circuit. Thus, the new signal may be applied to the record electronics of the recording and reproducing apparatus and a control signal of the type illustrated in FIGURE 4 be applied to the fast switching means. The control signal includes horizontal sync pulses 23 which are recovered from the existing video signal recorded on the tape and designate the opposite ends of each horizontal line of the signal. In a portion of the control signal generally designated at 24, the signal level is constant between the sync pulses. In a succeeding portion 26, a gate pulse 27 is initiated at about a third of the way between the sync pulses and persists to about two thirds of the way therebetween. The next portion 28 of the signal includes a similar gate pulse 27'. The signal portion 24 thus corresponds to the last line of the first third of a field, while portions 26 and 28 correspond to the first two lines of the second third of the field. The fast switching means is not switched to its record condition in response to signal portion 24. However, responsive to portions 26 and 28, the switching means is switched to the record condition for the durations of gate pulses 27 and 27'. The new video signal is thus recorded over the original signal in the central thirds of the corresponding lines to provide an edited tape which, upon playback, produces the image of FIGURE 3. Various means for generating the control signal, such as a conventional special effects generator, will suggest themselves to those skilled in the art. For example, the sync pulses may be employed to trigger a time delay persisting for one third of a line. The delayed output of the delay may in turn trigger a pulse generator capable of generating a pulse having a duration equal to that of a third of a line. In this manner, the gate pulses 27 are appropriately provided. The sync pulses may be also applied to a Tape Apparatus Synchronizing System as disclosed in U.S. Patent No. 3,017,462, operated in the playback mode and receiving the horizontal sync pulses of the new signal. The sync pulses of the respective signals are compared in the synchronizing system to develop suitable error signals for controlling tape and head drum positions to record the new signal in the correct portion of the original signal with a high degree of time base stability.

Although the invention has been described hereinbefore with respect to specific steps of the method, numerous variations and modifications may be made therein without departing from the true spirit and scope of the invention, and thus it is not intended to limit the invention except by the terms of the following claims.

What is claimed is:

1. A method of operating video tape recording and reproducing apparatus to erase portions of an existing video signal recorded on a magnetic tape and record a new video signal on the erased portions of said existing signal, said tape having a control track recorded thereon associated with said existing signal, said apparatus including video RF heads on a head drum rotating adjacent said tape, a capstan moving said tape adjacent said head drum, a head drum servo for controlling rotation of said drum in accordance with a head drum error signal, a capstan servo for controlling said capstan to move said tape in accordance with a capstan error signal, and a tachometer driven by said head drum to generate tachometer pulses representative of head drum position, said servos having a playback mode in which said head drum error signal is derived by comparison between said tachometer pulses and a reference and said capstan error signal is derived by comparison between said tachometer pulses and said control track, said method comprising energizing said video RF heads with said new video signal at predetermined points of said existing video signal recorded on said tape to record said new signal over said existing signal, and maintaining said playback mode of said servos prior to and during energization of said video RF heads with said new video signal to maintain close registration between the locus of the record heads and the previously recorded tracks during recording of the new video signal.

2. A method according to claim 1, wherein said energizing said video RF heads with said new video signal comprises gating said new video signal to said video RF heads during predetermined segments of predetermined horizontal lines of each of a number of fields of said existing video signal recorded on said tape.

3. An electronic editing method for magnetic tape in helical scan video tape recording and reproducing apparatus, said magnetic tape having an existing helically scanned video signal recorded thereon and an associated control track, said apparatus including a capstan for moving said tape, video RF heads on a head drum rotating adjacent said tape to helically scan same, a head drum servo for controlling rotation of said drum in accordance with a head drum error signal, a capstan servo for controlling said capstan to move said tape in accordance with a capstan error signal, a video erase head disposed transverse to said tape at a position displaced upstream from said head drum, and a tachometer driven by said head drum to generate tachometer pulses representative of head drum position, said servos having a playback mode in which said head drum error signal is derived by comparison between said tachometer pulses and a reference and said capstan error signal is derived by comparison between said tachometer pulses and said control track, said editing method comprising energizing said video RF heads with a new video signal when predetermined points of said existing video signals are adjacent said RF heads, simultaneously energizing said erase head with erase current, and maintaining said servos in said playback mode.

4. A method of erasing a previously recorded video signal on magnetic tape and recording new video signal thereon comprising moving a previously recorded magnetic tape in a magnetic recording and reproducing apparatus by means of a capstan thereof while scanning said tape with magnetic head means supported on a rotating head drum, the head means being energized by a new video signal to effect recording of said new signal on said tape, and maintaining in a playback mode servos of said apparatus associated with said capstan and said head drum for controlling said scanning and position of said tape during recording said new signal wherein said servos are synchronized with a control track of said previously recorded signals to maintain close registration between the locus of the recording head and the previously recorded tracks.

5. Method according to claim 4 wherein said energizing said head means with said new video signal comprises gating said new video signal to head means during predetermined segments of predetermined horizontal lines of each of a number of fields of said previously recorded video signals recorded on said tape.

References Cited

UNITED STATES PATENTS 3,176,067 3/1965 Machein et al. ------ 179—100.2

OTHER REFERENCES

Video Tape Recording, by J. L. Bernstein, © July 1960, by John F. Rider, Pub., Inc., p. 143.

BERNARD KONICK, *Primary Examiner.*

J. RUSSELL GOUDEAU, *Assistant Examiner.*

U.S. Cl. X.R.

178—6.6